E. H. MANNING.
FRICTIONAL POWER TRANSMISSION DEVICE.
APPLICATION FILED OCT. 18, 1907.

908,293.

Patented Dec. 29, 1908.
2 SHEETS—SHEET 1.

Witnesses

Inventor
Ebenezer H. Manning
By Victor J. Evans
Attorney

E. H. MANNING.
FRICTIONAL POWER TRANSMISSION DEVICE.
APPLICATION FILED OCT. 18, 1907.
908,293.
Patented Dec. 29, 1908.
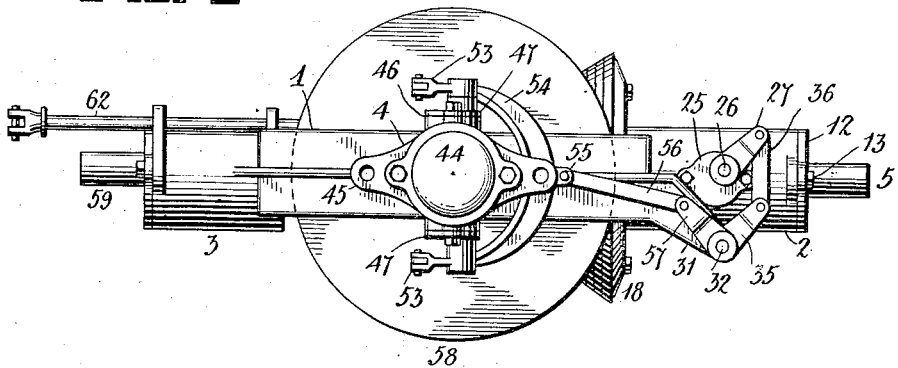
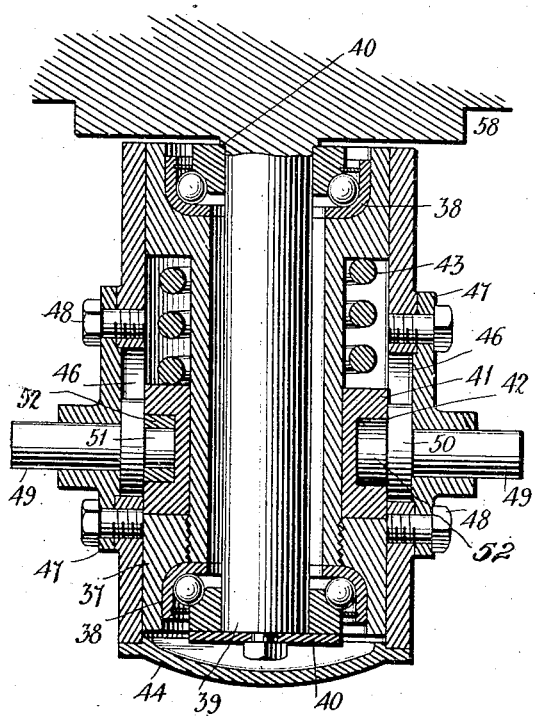
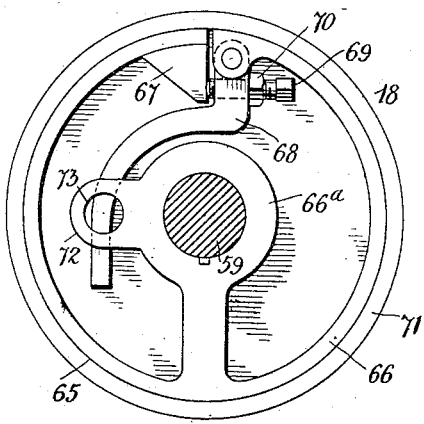
Witnesses
Inventor
Ebenezer H. Manning
By Victor J. Evans
Attorney

UNITED STATES PATENT OFFICE.

EBENEZER H. MANNING, OF ELKHART, INDIANA.

FRICTIONAL POWER-TRANSMISSION DEVICE.

No. 908,293.  Specification of Letters Patent.  Patented Dec. 29, 1908.

Application filed October 18, 1907. Serial No. 398,110.

*To all whom it may concern:*

Be it known that I, EBENEZER H. MANNING, a citizen of the United States, residing at Elkhart, in the county of Elkhart and State of Indiana, have invented new and useful Improvements in Frictional Power-Transmission Devices, of which the following is a specification.

This invention relates to frictional power transmitting devices; and it has for its principal object to provide a device of this character with means for regulating the frictional contact between the transmission members; further objects being to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
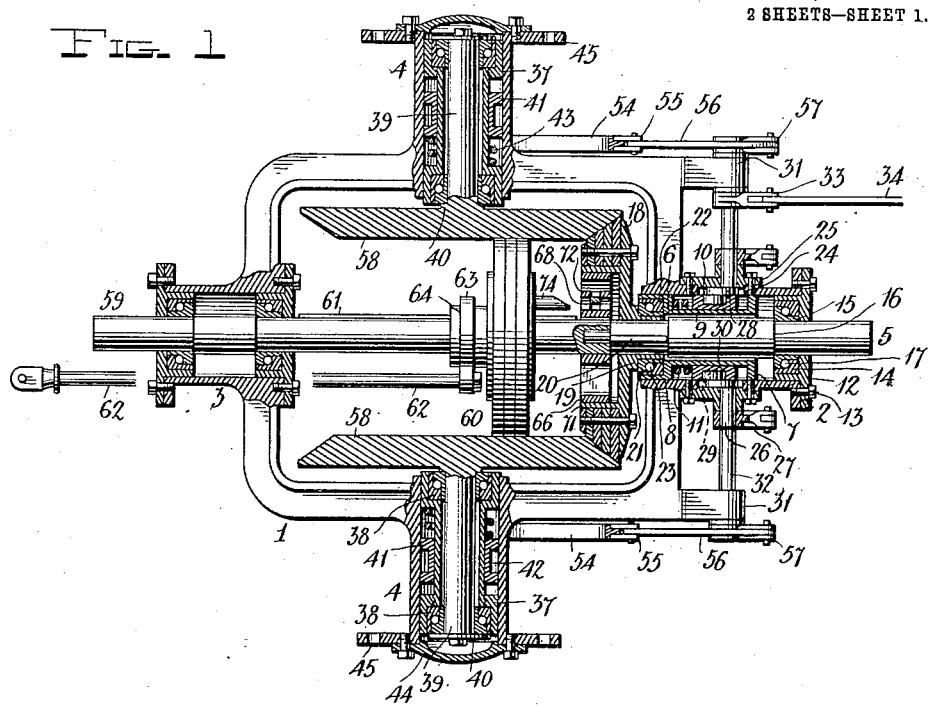
Figure 2:
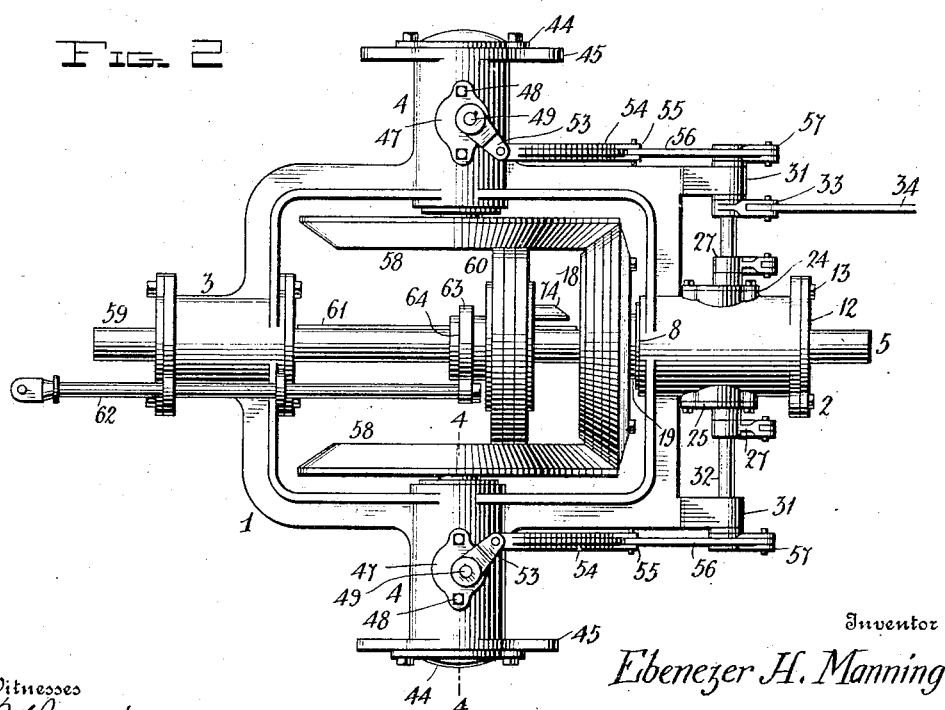

In the drawings, Figure 1 is a horizontal sectional view of a power transmission device constructed in accordance with the invention. Fig. 2 is a plan view of the same. Fig. 3 is a side elevation. Fig. 4 is a sectional detail view taken on the plane indicated by the line 4—4 in Fig. 2. Fig. 5 is a cross-section through the driven shaft looking toward the face of the main friction disk.

Corresponding parts in the several figures are denoted by like characters of reference.

The frame of the improved power transmission device comprises an approximately rectangular casting 1 provided at its front and rear ends with cylindrical sleeves 2 and 3 and at its sides with similar sleeves 4—4. The sleeves 2 and 3 are in axial alinement with each other, and the sleeves 4—4, which are preferably disposed intermediate and at right angles to the sleeves 2—3, are likewise in axial alinement.

The main driving shaft 5 which receives motion from any suitable source of power, such as gasolene or other motor, is supported for rotation in a sleeve or hub 6 longitudinally slidable in the cylinder 2, and provided at the ends thereof with flanges 7 and 8 bearing against the interior walls of the cylinder. The sleeve 6 carries, between the front and rear flanges 7 and 8, a slidable ring or collar 9 having a circumferential groove 10, and between said collar and the flange 8 at the rear end of the sleeve 6 is interposed a coiled extension spring 11 which serves, assuming the collar 9 to be held stationary, to force the sleeve 6 in a rearward direction.

The cylinder 2 is provided at its front end with a cap 12 secured in position detachably by means of screws or bolts 13; said cap affording a seat for one of the annular members 14 of an anti-friction bearing, the other annular member of which, 15, surrounds the motor driven shaft 5 and abuts upon a shoulder 16 upon said shaft; anti-friction balls 17 being interposed between the said annular members which constitute the ball-race. The shaft 5 carries at its rear end a friction wheel or disk 18, the hub of which, 19, is in slidable engagement with said shaft with which it is also connected for rotation by means of a key or spline 20; the hub 19 carries one of the annular members 21 of an anti-friction bearing, the other member of which 22 is connected with and carried by the sleeve 6; anti-friction balls 23 being interposed between the said annular members. It will be recognized that under this construction the two ends of the shaft are supported in anti-friction bearings, one set of anti-friction bearings serving also to support the hub of the friction disk 18; the latter being movable longitudinally of the shaft with the sleeve 6, while said shaft is held securely against longitudinal movement.

The sides of the cylinder 2 are provided with circular recesses or apertures 24 for which detachable caps or closures 25 are provided, said caps affording bearings for trunnion shafts 26 provided at their outer ends with cranks 27 and at their inner ends with eccentric disks 28 having crank pins 29 provided with roller bearings 30 that engage the circumferential groove 10 in the collar 9 slidable upon the sleeve 6, at diametrically opposite sides of said collar. It will be observed that by manipulating the trunnion shafts 26, the collar 9 may be moved longitudinally of the sleeve 6; also that when said collar is moved in a rearward direction, the sleeve 6 will likewise be moved rearward under the impulse of the spring 11, which latter is compressed by the rearward movement of the collar.

The frame 1 is provided with lugs or brackets 31 constituting bearings for a transverse shaft 32 having a crank 33 from which a link or rod 34 leads to an operating lever or treadle, not shown, by means of which the rock shaft 32 will be oscillated; said rock shaft is provided with cranks 35 connected by links 36 with the cranks 27 upon the trunnion shafts which latter may thus be rocked or oscillated to effect the desired adjustment of the sleeve 6 and related parts.

The cylinders 4—4 at the sides of the frame accommodate slidable sleeves 37 having flanged ends provided with seats for suitably constructed anti-friction bearings 38. Shafts 39 are supported for rotation in the anti-friction bearings 38, said shafts being provided with shoulders 40 abutting upon said bearings, so that said shafts will be movable with the sleeves carrying the anti-friction bearings. The sleeves 37 are provided with slidable collars 41 having annular grooves 42; and coiled compression springs 43 are interposed between said collars and the flanges at the inner ends of the sleeves.

The cylinders 4 are provided at their outer ends with detachable caps 44 and with laterally extending perforated lugs 45 for the passage of bolts or other fastening members whereby the frame 1 may be mounted securely in the chassis of an automobile or motor vehicle. The cylinders 4—4 are provided in their upper and under sides with diametrically opposite recesses or apertures 46 for which detachable caps or closures 47 are provided; said caps or closures being secured in position by fastening means such as screws or bolts 48. The caps 47 afford bearings for trunnion shafts 49 provided at their inner ends with eccentric disks 50 having crank pins 51 provided with roller bearings 52 engaging the annular grooves 42 in the collars 41, which latter may thus be moved longitudinally within the cylinders 4 by oscillating the trunnion shafts. The latter are provided at their outer ends with cranks 53 which are pivotally connected with the ends of crescent shaped curved or arcuate bars or yokes 54 provided intermediate their ends with lugs or ears 55 which are connected by links 56 with cranks 57 upon the rock shaft 32. It will thus be seen that when the latter is operated by operating the lever or treadle connected with the link 34, for the purpose of actuating the trunnion shafts 26 connected with the cylinder 2; motion will at the same time be transmitted to the trunnion shafts 49 of the cylinders 4, and the bearing sleeves in said cylinders will be actuated to carry the shafts 39 in an inward direction.

The shafts 39 are provided at their inner ends with friction disks 58 having beveled edges which are adapted to contact frictionally with the correspondingly beveled edge of the friction wheel 18 carried by the motor driven shaft 5. It will be readily observed that by manipulating the rock shaft 32, the wheels 18 and 58—58 will be moved in the direction of a common center, and the frictional edges of said disks will be placed in engagement or contact with each other. By continuing the oscillatory movement of the rock shaft, the springs interposed between the bearing sleeves and the grooved collars will become compressed, and exert pressure upon the bearing sleeves commensurate with the degree of oscillatory movement to which the rock shaft is subjected. Thus, the contact between the frictional transmission disks may be very accurately gaged and regulated according to the necessities of the moment which are naturally governed by the amount of load to be moved and by other considerations.

Supported for rotation in suitable anti-friction bearings in the cylinder 3 is a shaft 59 which is intended to be directly connected with the parts that are to be driven; this shaft carries a frictional transmission disk 60 which is longitudinally movable thereon and connected therewith for rotation by means of a feather or spline 61; the rim or periphery of the disk 60 is in frictional engagement with the faces of the oppositely disposed disks 58, from which it receives motion, as will be readily understood; the degree of speed being regulated by the distance of the disk 60 from the axes of rotation of the disks 58 while, by moving the disk 60 diametrically across the faces of the disks 58 from one side of the axis to the other, the direction of rotation will be reversed, as will be readily understood. Adjustment of the disk 60 is effected by means of the slidably supporting adjusting rod 62 having a ring or collar 63 engaging an annular groove 64 in the hub of the disk 60.

At times it is desired to secure what is known as a direct drive, and this is obtained in the following manner. The friction disk 18 connected with the motor driven shaft is provided in the face thereof with a cavity or recess 65 in which is located a clutch ring 66, having a hub 66ª keyed upon the transmission shaft 59, and said clutch ring being in the nature of a split ring provided at one terminal with an inward extending lug 67 and at the other adjacent terminal with a suitably supported lever 68 having a set screw 69 bearing against the lug 67 and equipped with a jam nut 70; this construction being resorted to for the purpose of enabling the ring to be expanded when needed for the purpose of compensating for wear of said ring against the flange 71 at the edge of the recess or cavity 65 in which the clutch ring is seated. The hub 66ª of the clutch ring is provided with an inward extending lug 72 having an aperture 73 in the path of which the lever 68 is extended. The transmission disk 60, which is supported for longitudinal movement upon the shaft 59, carries a projecting wedge 74 which is adapted to enter the aperture 73 adjacent to the lever 68, which latter, when rocked or oscillated by the action of the wedge, will serve to expand the clutch ring, placing the latter in frictional engagement with the rim or flange 71 of the wheel 18, and locking the parts securely together for the direct transmission of power as will be readily understood.

Having thus fully described the invention, what is claimed as new is:—

1. In a frictional power transmitting device, a motor driven shaft, a friction wheel supported upon said shaft for rotation therewith and for longitudinal sliding movement, a bearing member having an anti-friction bearing for the shaft, a sleeve slidable in the bearing member and having an anti-friction bearing for the friction wheel, a collar slidable upon the sleeve, a compression spring coiled upon the sleeve bearing at one end against the slidable collar and at the other end against a flange upon the sleeve, and means for effecting longitudinal movement of the collar.

2. In a device of the class described, a shaft, a friction disk slidably and rotatably mounted thereon, a bearing for the shaft, a non-rotatable sleeve through which the shaft extends, said sleeve having a bearing for the friction disk, a spring acting on the sleeve for advancing the friction disk, an adjusting member for regulating the pressure of the spring, and operating means for advancing and retracting said adjusting member.

3. In a device of the character described, a shaft, a friction disk carried by the shaft, a non-rotatable sliding sleeve surrounding the shaft, a spring acting on the sleeve to advance the friction disk, a sliding member for compressing and relaxing the spring, and operating means for sliding said member.

4. In a device of the character described, a shaft, a friction disk carried by the shaft, a non-rotatable sliding sleeve surrounding the shaft and adapted in its reverse movements to advance and retract the disk, a spring acting on the sleeve, a movable member for compressing and relaxing the spring, and eccentric means for advancing and retracting said movable member.

5. In a device of the character described, a shaft, a friction disk carried by the shaft, a sleeve surrounding the shaft and adapted to slide in reverse directions to effect the projection and retraction of the disk, a spring acting on the sleeve to project the disk and permit a yielding retractive movement thereof, a second sleeve surrounding said sliding sleeve and movable in reverse directions to compress and relax the spring, and means for operating said second sleeve.

6. In a device of the class described, a plurality of friction disks supported for movement in the direction of a common center and adapted for peripheral contact with each other, slidably mounted sleeves supporting said disks, circumferentially grooved collars upon the sleeves, springs engaging said collars and sleeves and forcing them in opposite directions, bearing members for the sleeves having oppositely disposed recesses, caps constituting closures for said recesses, trunnion shafts supported for oscillation in the caps and having eccentric disks provided with crank pins engaging the grooved collars, and means for rocking or oscillating the several trunnion shafts in unison.

7. In a device of the class described, a plurality of friction disks supported for movement in the direction of a common center and adapted for peripheral contact with each other, slidably mounted sleeves supporting said disks, circumferentially grooved collars slidable upon the sleeves, springs engaging said collars and sleeves and forcing them in opposite directions, bearing members for the sleeves having oppositely disposed recesses, caps constituting closures for said recesses, trunnion shafts supported for oscillation in the caps and having eccentric disks provided with crank pins engaging the grooved collars, cranks upon the trunnion shafts, a transversely arranged rock shaft having a plurality of cranks, links connecting the cranks of the rock shaft with the cranks upon the trunnion shafts, and means for oscillating the rock shaft.

8. In a device of the character described, a shaft, a friction disk carried by the shaft, a non-rotatable sliding sleeve surrounding the shaft and adapted in its reverse movements to advance and retract the disk, a second sleeve slidably mounted on the first-named sleeve, a spring arranged to exert feeding pressure on the first-named sleeve and to be compressed and relaxed by reverse movements of the second sleeve, trunnions having eccentrics oppositely connected with said second sleeve to move the same in reverse directions, and means for oscillating said trunnions.

9. In a device of the character described, a shaft, a friction disk carried thereby, a non-rotatable sliding sleeve inclosing the shaft and movable in opposite directions to advance and retract the disk, a second sleeve slidably mounted on the first-named sleeve, a spring disposed to be compressed and expanded by the second sleeve and to advance and permit retraction of the first sleeve, eccentrics operatively engaging the second sleeve, trunnions carrying said eccentrics, a rock shaft, and connections between the rock shaft and the trunnions for oscillating the latter to slide said second sleeve in reverse directions.

10. In a device of the character described, a shaft, a friction disk slidably and rotatably mounted thereon, a bearing for the shaft, a non-rotatable sliding sleeve having a bearing for the disk, a second sleeve slidably mounted on the first-named sleeve, a spring interposed between portions of the sleeves for advancing the first-named sleeve and disk and permitting a yielding retraction thereof, eccentric devices for adjusting the second sleeve, and means for operating said eccentric devices.

11. In a device of the character described, a shaft, a friction disk carried thereby, a slidably mounted sleeve for advancing and retracting the disk, a spring expansible to advance the sleeve and disk, a second sleeve slidable in reverse directions to compress and relax the spring, eccentrics for operating said second sleeve, trunnions carrying said eccentrics, and means for oscillating the trunnions.

12. In a device of the character described, a bearing sleeve, a shaft, a friction disk carried thereby, a non-rotatable sliding sleeve disposed within the bearing sleeve and surrounding the shaft, a spring for advancing said sleeve and disk, a second sleeve slidably mounted on the first-named sliding sleeve to compress and relax the spring, operating means for said second sleeve mounted upon the said bearing sleeve, and means for transmitting motion to said operating means.

13. In a device of the class described, a plurality of friction disks supported for movement in the direction of a common center and adapted for frictional contact with each other, and means for simultaneously and resiliently forcing the disks in the direction of the said common center, each of said disks having independent resilient contact with the coacting disk or disks.

14. In a device of the class described, a plurality of friction disks supported for movement in the direction of a common center for frictional contact with each other, spring means for advancing and yieldingly backing each disk in its projected position, and means for simultaneously controlling the spring means of the several disks.

15. In a device of the character described, a plurality of friction disks supported for movement in the direction of a common center for contact with each other, an adjusting device connected with each disk, a spring for advancing and yieldingly backing each adjusting device, a second adjusting device associated with each spring and its adjusting device for compressing and expanding the spring, whereby the compression of the spring effects the projection of the disk and its yielding support in operative position, means for operating said adjusting device in reverse directions to respectively compress the spring and relax it and with the latter action retract the first adjusting device, and means for adjusting the said operating devices of all the disks in unison.

16. In a device of the character described, a plurality of friction disks supported for movement toward and from a common center, feed devices for the several disks, each including a primary sliding adjusting device, a secondary sliding adjusting device, a spring disposed between said devices to exert expansive pressure on the primary adjusting device, means for operating the secondary adjusting device in reverse directions to respectively compress the spring and relax the spring and return the primary adjusting device to retracted position, and means for operating the secondary adjusting devices of the several disks in unison.

17. In a device of the class described, a motor driven shaft, a bevel edged friction wheel supported thereon for rotation and having a cavity or recess, a transmission shaft supported in axial alinement with the motor driven shaft, a friction wheel longitudinally movable upon the transmission shaft, a clutch member consisting of a split ring secured upon the transmission shaft and accommodated in the cavity of the friction wheel upon the motor driven shaft, a hub on the shaft carrying said ring and having a laterally extending apertured lug, an expanding lever for the ring movably engaging the apertured lug, and a wedge member projecting from the friction wheel slidable upon the transmission shaft and adapted to engage the expanding lever through the aperture in the lug.

18. In a device of the class described, a plurality of friction disks supported for movement in the direction of a common center for contact with each other, slidably mounted spring actuated sleeves supporting said disks, and means for exerting positive pressure against the actuating springs of the sleeves to effect simultaneous longitudinal movement of said sleeves.

19. In a device of the class described, a plurality of friction disks supported for movement in the direction of a common center for contact with each other, slidably mounted sleeves supporting said disks, circumferentially grooved collars upon said sleeves, springs engaging said collars and sleeves and forcing them in opposite directions, and means for effecting simultaneous positive movement of the collars in the direction of and against the tension of the springs.

20. In a device of the class described, a plurality of friction disks supported for movement in the direction of a common center for peripheral contact with each other, slidably mounted spring actuated sleeves having anti-friction bearings for said disks, and means for simultaneously placing said actuating springs under tension for forcing said disks in the direction of the common center.

In testimony whereof I affix my signature in presence of two witnesses.

EBENEZER H. MANNING.

Witnesses:
WM. BAGGER,
JOHN L. FLETCHER.